(12) United States Patent
Persson et al.

(10) Patent No.: US 7,031,679 B2
(45) Date of Patent: Apr. 18, 2006

(54) ESTIMATING POWER ON SPATIAL CHANNELS

(75) Inventors: Johan L. Persson, Palo Alto, CA (US); Mitchell D. Trott, Mountain View, CA (US)

(73) Assignee: ArrayComm, LLC, San Jose, CA (US)

( * ) Notice: Subject to any disclaimer, the term of this patent is extended or adjusted under 35 U.S.C. 154(b) by 538 days.

(21) Appl. No.: 10/107,035

(22) Filed: Mar. 27, 2002

(65) Prior Publication Data

US 2003/0203723 A1 Oct. 30, 2003

(51) Int. Cl.
H04B 17/02 (2006.01)

(52) U.S. Cl. .................. 455/137; 375/347

(58) Field of Classification Search ............ 455/69, 455/522, 561, 63.1, 114.2, 278.1, 277.2, 296, 455/501, 500, 562, 101, 272, 90, 273, 135, 455/137; 375/347, 135, 136, 259, 254, 285
See application file for complete search history.

(56) References Cited

U.S. PATENT DOCUMENTS

| | | | | |
|---|---|---|---|---|
| 5,402,451 A | * | 3/1995 | Kaewell, Jr. et al. | 375/347 |
| 5,548,837 A | * | 8/1996 | Hess et al. | 455/278.1 |
| 5,822,380 A | * | 10/1998 | Bottomley | 375/347 |
| 5,886,988 A | | 3/1999 | Yun et al. | |
| 6,122,260 A | | 9/2000 | Liu et al. | |
| 6,188,913 B1 | | 2/2001 | Fukagawa et al. | |
| 2002/0013164 A1 | * | 1/2002 | Leifer et al. | 455/562 |
| 2002/0193146 A1 | * | 12/2002 | Wallace et al. | 455/562 |

FOREIGN PATENT DOCUMENTS

| | | |
|---|---|---|
| WO | WO 98/30047 | 9/1998 |
| WO | WO 98/58462 | 12/1998 |
| WO | WO 00/72482 A1 | 11/2000 |

* cited by examiner

Primary Examiner—Nay Maung
Assistant Examiner—Tu X Nguyen
(74) Attorney, Agent, or Firm—Blakely, Sokoloff, Taylor & Zafman LLP

(57) ABSTRACT

The power of a signal received on a spatial channel in a wireless radio communications system can be estimated. One embodiment of the invention includes receiving a signal at a plurality of antenna elements, the received signal including a first component from a first radio and a second component from a second radio. Then the contribution of the first component to the received signal may be estimated by calculating a first power estimate for the first radio using the received signal, calculating a second power estimate for the second radio using the received signal, and estimating the contribution of the first component to the received signal, the estimation using the first power estimate and the second power estimate. In one embodiment the first power estimate is an SINR of the first component.

44 Claims, 4 Drawing Sheets

ESTIMATING POWER ON SPATIAL CHANNELS

BACKGROUND OF THE INVENTION

1. Field of the Invention

The present invention applies to the field of wireless communications systems using antenna arrays and, in particular, to estimating the power of a signal received on a spatial channel.

2. Description of the Prior Art

Adaptive antenna arrays and SDMA (Spatial Division Multiple Access) enable a wireless system to use strategies to reduce interference and enhance system capacity. These strategies include 1) increasing the signal to interference ratio on the uplink (user terminal to base station) by adjusting received signal samples based on the location of a remote terminal and the RF environment, 2) concentrating signal power to the intended user terminal (beam-forming), and 3) placing nulls to user terminals using similar or the same frequency resources, such as terminals using the same channel on the downlink (base station to user terminal), among others. With these strategies, adaptive arrays can greatly enhance the capacity of a wireless system.

Using various SDMA strategies a base station may be able to communicate with more than one user terminal on the same conventional communications channel. These user terminals sharing a conventional channel are here referred to as "co-spatial" user terminals. The number of user terminals with which a base station can successfully communicate using a single communications channel may vary. Using the SDMA strategies, the conventional channel may be divided into multiple spatial channels to be used by as many remote terminals.

It may be desirable to determine the power of the signals on each spatial channel. That is, it may be desirable to determine how much each signal on each spatial channel is contributing to the received signal. It may also be desirable to estimate the power of signals received from co-channel interferers, that is, terminals communicating with other base stations, or in other cells, reusing the same communications channel. These may be done by estimating the spatial signature of a remote terminal whose power level is to be determined, and calculating the norm, i.e. magnitude, of the spatial signature. The problem with this method is that the spatial signature estimate may be very noisy. For example, if the signal on a spatial channel from a remote terminal is somewhat strong relative to the signal from the remote terminal whose power level is being estimated, the spatial signature will be of poor quality. Given a poor spatial signature, taking the norm of this signature will result in a poor estimate of the power contribution.

One way to improve the power estimation is by having better spatial signature estimates. This may include using a joint maximum likelihood signature estimation. This strategy involves finding spatial signatures by minimizing a function of the received signal and two reference signals. The problem with this method is that a minimization needs to be performed, which is a complex and resource-consuming task. Furthermore, the two reference signals need to be available for calculation simultaneously, further consuming memory resources.

BRIEF SUMMARY OF THE INVENTION

The power of a signal received on a spatial channel in a wireless radio communications system can be estimated. One embodiment of the invention includes receiving a signal at a plurality of antenna elements, the received signal including a first component from a first radio and a second component from a second radio. Then the contribution of the first component to the received signal may be estimated by calculating a first power estimate for the first radio using the received signal, calculating a second power estimate for the second radio using the received signal, and estimating the contribution of the first component to the received signal, the estimation using the first power estimate and the second power estimate. In one embodiment the first power estimate is an SINR of the first component.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Power Estimation

The power of signals sent by co-spatial user terminals can be estimated. That is, the contribution due to a co-spatial terminal to the signal received by the base station may be estimated. This may be accomplished by calculating power estimates for two or more co-spatial remote terminals, and combining these measurements in a way that produces a better estimate of the power of the signal from one of the remote terminals.

Power estimation may be performed as often as desired. In a system using bursts, the power of each signal component may be estimated each burst. The higher the frequency of the power estimations, the more desirable it is to limit the computational complexity of the estimations.

Figure 1:
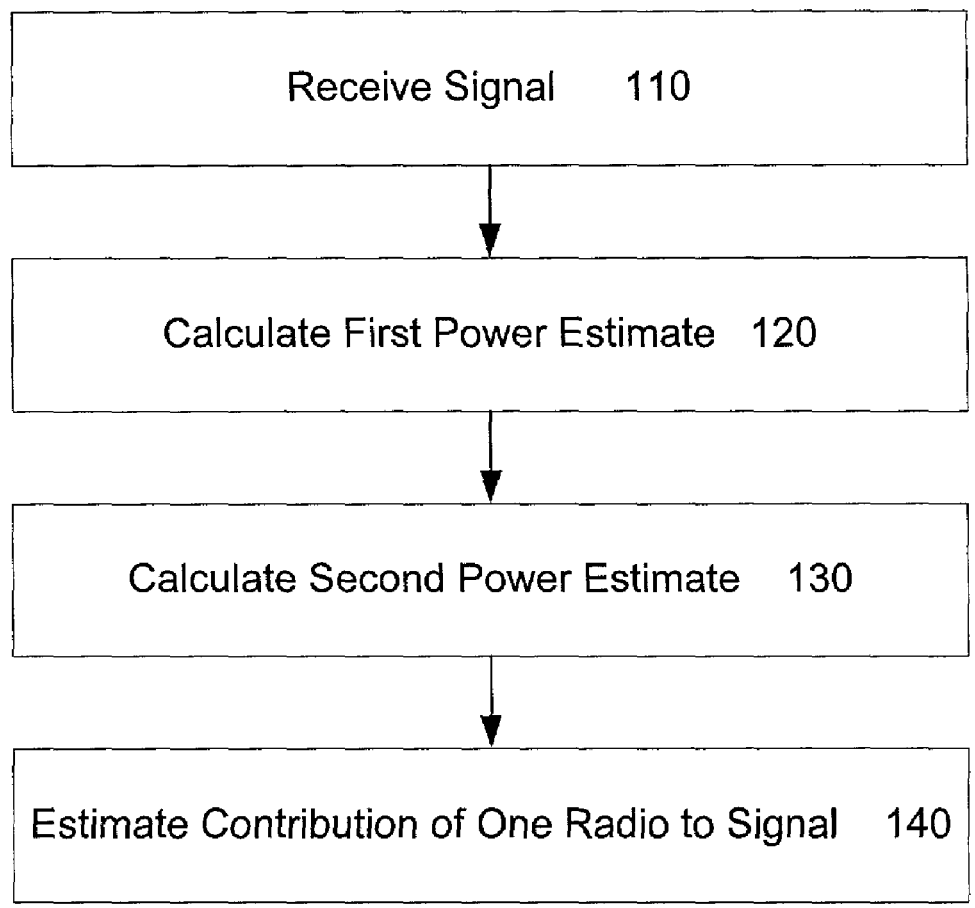
FIG. 1 is a flow chart of a process for measuring the contribution of a signal from a first radio to a received signal implemented in accordance with an embodiment of the invention.
Figure 3:
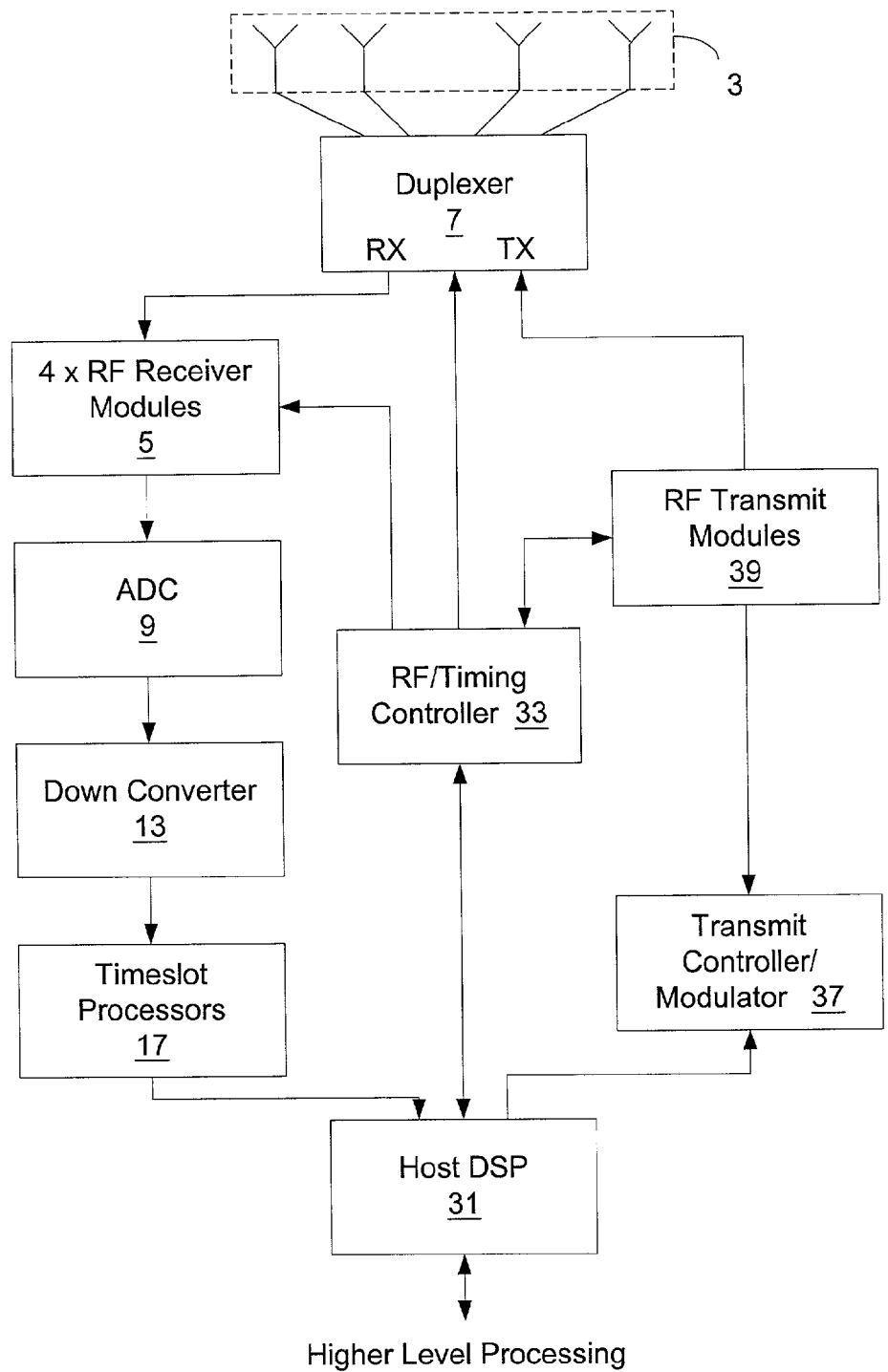
FIG. 3 is a simplified block diagram of a base station on which an embodiment of the invention can be implemented.

Any time a signal arrives at a base station antenna array, for example an antenna array such as antenna 3 on the base station pictured in FIG. 3, the power of the signal components may be estimated. Since the signal received is a combined signal of all spatial channel communications, the signals from each remote terminal are components of the signal received. The terms "power on a spatial channel," "power of a signal from one remote terminal," "component power," "contribution of one terminal to the received power," and similar terms may be used interchangeably herein depending on context. For simplicity, the following discussion demonstrates embodiments of the invention using two remote terminals to estimate the power of one remote terminal. Using the same methods and techniques, these embodiments may be modified to use more than two remote terminals. Several embodiments of the present invention are now described with reference to FIG. 1.

Power estimation, according to one embodiment of the invention, begins with receiving a signal at a base station antenna array 110, such as the base station of FIG. 3. The signal may be a composite signal. For example, the received signal may result from two signals being transmitted from two remote terminals that combine during propagation and arrive at the antenna array of the base station as one received signal. This received signal includes both transmitted signals, which can be extracted from the received signal using an SDMA strategy.

For example, the base station may use a reference signal or a known sequence for the first remote terminal to determine spatial processing weights for the first remote terminal. These weights may consist of an amplitude and phase adjustment for each sample received at each antenna element of the antenna array. The signal transmitted by the first remote terminal may be extracted from the received signal by applying the weights to the received signal samples.

A single weight that determines the phase and amplitude adjustment at one antenna element may be expressed as a complex number for mathematical calculations. A collection of weights for each antenna element may be expressed as a complex vector with one complex number element for each antenna element of the antenna array. Applying this weight vector to a signal sample may mean scaling each sample at each antenna element by the corresponding element of the weight vector, and summing the resulting quantities. The signal sent by the second remote terminal may be extracted in a similar fashion.

The components of the received signal may be the contributions from each remote terminal and noise. For two remote terminals, the received signal may be modeled mathematically as:

$$z(k) = a_{1true} s_1(k) + a_{2true} s_2(k) + n(k); \qquad (1)$$

where $s_1$ and $s_2$ are the signals transmitted from the first and the second remote terminals respectively, with k indicating the $k^{th}$ sample; $a_{1true}$ and $a_{2true}$ are vectors that describe the relative phase and amplitude of the signals $s_1$ and $s_2$ at each antenna element of the antenna array; and n(k) is a vector that describes the noise and interference from other terminals at each antenna element for each sample k. Vectors $a_{1true}$ and $a_{2true}$ can represent the respective true spatial signatures of the two remote terminals. A true spatial signature may be a theoretical value that can only be estimated in a real-world system. Equation 1 shows the major components of the received signal.

In one embodiment of the invention, a power estimate for the first remote terminal may be calculated 120. This estimate is here referred to as the "first power estimate." The first power estimate may be calculated using a processor, such as DSP 31 in FIG. 3. The first power estimate may be calculated in many ways. It may be a measurement related to the quality of the component signal received from the first remote terminal. It may also be based on the quality of the spatial channel used by the first remote terminal, on the component signal's power, or on other physical properties of the signal.

In one embodiment, the first power estimate is a metric based on the quality of the signal from the first terminal, such as a signal to noise ratio (SNR) of the extracted component signal. Using an SDMA strategy, as described above, the signal from the first remote terminal is extracted from the received signal. Then, a ratio relating the strength of the component signal to the strength of the noise on the spatial channel is determined. The SNR may be expressed as a ratio, in decibels (dBs), or in another mathematically equivalent manner. Furthermore, the SNR may be calculated in a variety of different ways.

In another embodiment, the first power estimate may be a signal to noise and interference ratio (SINR) of the extracted component signal. The SINR is similar to the SNR, but also takes interference due to other terminals into consideration. For example, the SINR may take the interference caused by the co-spatial terminal sharing the conventional channel with the first remote terminal into consideration. The SINR may also be determined in a number of ways.

For example, for a signal that carries PSK-modulated digital data, the signal being sampled at baud points, the SINR may be calculated using the Kurtosis of the signal. That is, the SINR may be determined by taking the in phase (I) and quadrature (Q) components of the signal samples whose quality is estimated, and performing the following calculations:

$$\overline{R^2} = \frac{1}{N} \sum_{k=1}^{N} I^2(k) + Q^2(k); \qquad (2)$$

$$\overline{R^4} = \frac{1}{N} \sum_{k=1}^{N} (I^2(k) + Q^2(k))^2; \qquad (3)$$

$$SINR = \frac{\sqrt{2 - \frac{\overline{R^4}}{(\overline{R^2})^2}}}{1 - \sqrt{2 - \frac{\overline{R^4}}{(\overline{R^2})^2}}} \qquad (4)$$

$$= \frac{A + \sqrt{A}}{1 - A}, \text{ where } A = 2 - \frac{\overline{R^4}}{(\overline{R^2})^2}.$$

where N is the number of signal samples;
$R^2$, $R^4$, and A are intermediate quantities, and A is sometimes referred to as the Kurtosis.

In another embodiment the SINR may be calculated as:

$$SINR = \frac{|<w, a>|^2}{(w^H \lambda w);} \qquad (5)$$

where w is the spatial processing weight vector for the remote terminal whose signal quality is being determined;
a is the spatial signature of the same terminal;
H is the complex conjugate (Hermitian) transpose operation;
<,> is the dot product operation; and
$\lambda$ is the noise and interference covariance matrix for the same terminal.

In yet another embodiment, the power estimate may be an independent quantity derived directly from the spatial processing weights and the estimated spatial signature. One advantage of this embodiment is that spatial processing weights and spatial signature estimates are generally already available, since they may be used to execute a SDMA strategy and spatial processing. The weights and the spatial signatures may be determined in a number of different ways.

For example, the spatial signature may be estimated by calculating the cross correlation vector $R_{zs1}$ as:

$$R_{ZS1} = \sum_{k=0}^{N-1} z(k)s_1(k)' = a_1 \quad (6)$$

where the notation is consistent with Equation 1, $s_1(k)'$ is the complex conjugate of $s_1(k)$, $s_1(k)$ being the complex representation of the $k^{th}$ sample of the signal transmitted from the first remote terminal, and $a_1$ stands for an estimate of the spatial signature $a_{1_{true}}$. A similar approach is described in detail, for example in U.S. Pat. No. 5,592,490 to Barratt. There are numerous other ways to estimate the spatial signature of the first remote terminal.

Various ways of determining spatial processing weights are also known. One way is to try various weights from a finite set of weights and choose the ones that result in a good SNR or SINR. Another way to calculate weights is to use a least-squares equation:

$$w_1 = R_{zz}^{-1} R_{zs1}; \quad (7)$$

where $R_{zs1}$ is the same as in Equation 6, and $R_{zz}^{-1}$ is the inverse of the matrix formed by:

$$\sum_{k=1}^{N-1} z(k)z(k)^H; \quad (8)$$

where H represents the complex conjugate (Hermitian) transpose operation.

There are numerous alternative ways of determining both the weights and the spatial signature for the first remote terminal. Generally, once either the spatial signature or the weights are determined and expressed in vector form by using some technique, the other quantity can also be derived. The two quantities may also be determined completely separately using unrelated techniques. For example, in one embodiment the spatial signature may be determined as in Equation 6, and the weights may be determined by maximizing an SNR of the extracted signal.

Once the signature and the weights are calculated, they may be combined to form the first power estimate in a number of ways. One way may include expressing the weights and the signature as vectors, and taking a product of the two vectors. For example, taking the dot product—also called the inner product—of the normalized weight vector and the signature estimate may provide a good intermediate quantity to be used in the generation of the power estimate. Since power is generally expressed in absolute and scalar terms, this quantity may undergo an absolute value or modulus operation, which may then be raised to powers in further calculations. In one embodiment the first power estimate may be mathematically expressed as:

$$F_1 = |<u_1, a_1>51|^2; \quad (9)$$

where $a_1$ is the spatial signature estimate;
$|x|$ is the modulus of x, x being a complex number; and
$u_1$ is the normalized weight vector, that is, a vector in the direction of $w_1$ having a length of one, mathematically expressed as $u_1 = w_1/\|w_1\|$.

The second power estimate for the second remote terminal may be calculated 130 in any of the ways the first power estimate is calculated. The second power estimate may also be calculated using the processing resources of a base station, such as DSP 31 in FIG. 3. Furthermore, the first and second power estimates may be calculated sequentially or in parallel, using one or more processors. For simplicity and ease of understanding, these embodiments are described as using two power estimates, but any number of power estimates may be evaluated depending on the number of co-spatial remote terminals to be used in the power estimation.

After the two power estimates are determined, they may be combined to estimate the contribution of the first remote terminal to the received signal 140. This combination may be done in several ways, and may be carried out by a processor, such as DSP 31 in FIG. 3. The way the contribution is estimated will generally depend on how the power estimates were calculated. In one embodiment, the two power estimates are related in a way that may cause a ratio of the power estimates to provide a good contribution estimate. Other embodiments may implement the combination using other mathematical operations.

In one embodiment of the invention, the two power estimates may each have an error factor. These error factors may be related in a way that they may be at least partially eliminated when certain mathematical operations are performed. For example, if both power estimates are incorrect by the same factor, then dividing the two power estimates cancels the error factors. For example, if the first power estimate is half of the correct power contribution of the first signal and the second power estimate is also half of the correct power contribution of the second signal, then dividing the two power estimates gives the same ratio as the ratio of the correct power contributions would give.

To demonstrate this mathematically, let $F_1$ and $F_2$ be the first and second power estimates, $F_1'$ and $F_2'$ be the true power of the signals from the first and second remote terminals, and the number two (2) be the error factor for both $F_1$ and $F_2$. In other words, the two power estimates are half of the correct power. Now, since $F_1' = F_1 * 2$ and $F_2' = F_2 * 2$, the equations below follow:

$$\frac{F_1'}{F_2'} = \frac{2F_1}{2F_2} = \frac{F_t}{F_2} \quad (10)$$

because the factor of two (2) cancels out. It also follows that:

$$\frac{F_1'}{F_1' + F_2'} = \frac{2F_1}{2F_1 + 2F_2} = \frac{2F_1}{2(F_1 + F_2)} = \frac{F_1}{F_1 + F_2} \quad (11)$$

In the same manner, during the computation of the contribution ratio, the first power estimate may be divided by the sum of the first and second power estimates. This is done so the ratio represents how the signal power from the first remote terminal relates to the combined signal power of the first and second remote terminals. As demonstrated by Equation 11, the error factors may cancel in the calculation of the contribution ratio.

The contribution ratio may represent the percentage contribution of the first remote terminal to the total received signal. The actual contribution estimate may then be determined by estimating or measuring the total power of the received signal on the conventional channel, and multiplying that measurement by the contribution ratio. In other words, one embodiment of the present invention may involve taking the percentage of the total power indicated by the contribution ratio to get the actual power contribution of the signal from the first remote radio. The total received power may be measured, estimated, or determined in any way. For example, the total power may be estimated by summing the squares of the magnitudes of the spatial signatures of all contributing co-spatial remote terminals on the conventional channel.

Demonstrative Example

Figure 2:
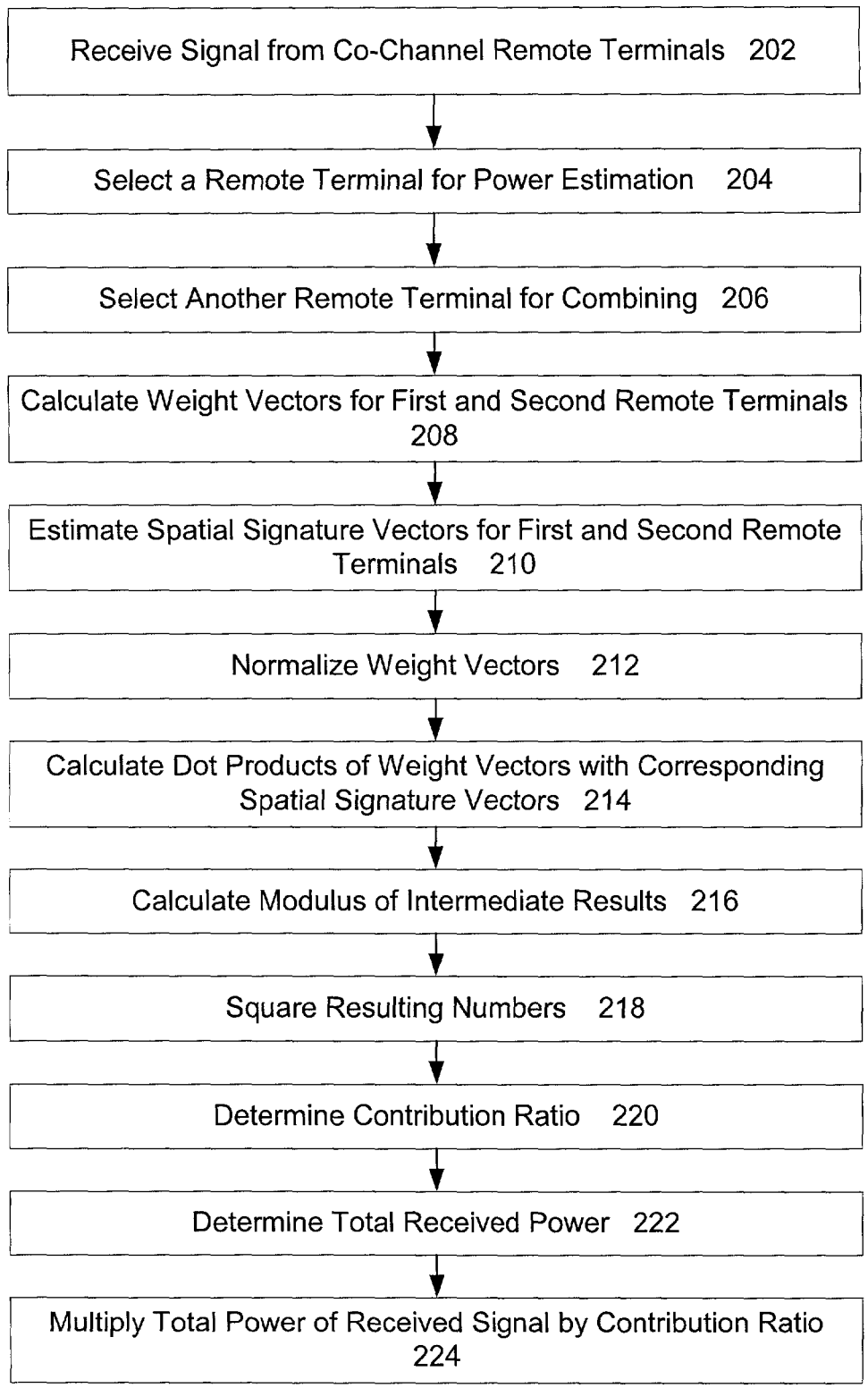
FIG. 2 is a flow chart of a particular, more specific example of the process of FIG. 1.

A more specific example of estimating a power contribution is described with reference to FIG. 2. Many of the details set forth with reference to FIG. 2 are not essential to carry out some embodiments of the invention, while other details may have numerous substitutes.

For this example, a base station is communicating with two remote terminals on a conventional channel by using an SDMA strategy that uses weight vectors. A burst from the two remote terminals arrives at the antenna array of the base station 202. The antenna array has four antenna elements. The received signal is the composite of the two signals transmitted from each remote terminal as they impinge on each of the four antenna elements after propagation. The received signal may also include thermal noise and co-channel interference from terminals communicating with other base stations. Furthermore, if more than two co-spatial terminals are sharing the channel, the base station may select two for power estimation. In this case the received signal may also include co-spatial interference.

A remote terminal is chosen 204 to be the one whose power level is estimated. The other remote terminal is chosen 206 for combining, so that measurements related to the two remote terminals may be used for the estimation. The two terminals will now be referred to as the first and the second remote terminal, respectively.

The spatial processing weight vectors for the first and second remote terminals, $w_1$ and $w_2$ in mathematical notation, can be determined 208 according to Equation 7, as $w_1 = R_{zz}^{-1} R_{zs1}$ and $w_2 = R_{zz}^{-1} R_{zs2}$. Since estimates of the spatial signature vectors for the first and second remote terminals show up as intermediate values during evaluation of these equations, the spatial signatures $a_1$ and $a_2$ can also be estimated 210. Since these quantities are available as by-products of the SDMA strategy used in this example, reusing them for power estimation may save computational resources or time.

The weight vectors are then normalized 212 by dividing the weight vectors $w_1$ and $w_2$ by their respective norms, $\|w_1\|$ and $\|w_2\|$ respectively, where $\|\ \|$ represents the norm, i.e. magnitude, operation. The normalized weight vectors $u_1 = w_1/\|w_1\|$ and $u_2 = w_2/\|w_2\|$ are unit length, that is, $\|u_1\| = \|u_2\| = 1$. Then, a dot product of the normalized weight vectors and the respective spatial signatures is determined 214. That is the quantities $<u_1, a_1>$ and $<u_2, a_2>$ are calculated. For the moment these intermediate quantities are referred to as $q_1$ and $q_2$ respectively. The quantities $q_1$ and $q_2$ are complex numbers whose absolute value may be referred to as a modulus. The calculated modulus 216 of these quantities is represented as $|q_1|$ and $|q_2|$.

In one embodiment, the quantity $|q_1|$ may be equal to the magnitude or norm of the true spatial signature, $\|a_{1true}\|$, multiplied by an error factor. This error factor may depend on the angle between the weight and the corresponding true spatial signature, that is, the angle between $w_1$ and $a_{1true}$. In one embodiment, the error factor may be estimated as $\cos(\alpha)$, that is, the cosine of the angle ($\alpha$) between $w_1$ and $a_1$. Similarly, the error factor of $|q_2|$ that it may be multiplied by to get $\|a_{2true}\|$ may be estimated as the cosine of the angle between $w_2$ and $a_2$. This error factor is here referred to as $\cos(\beta)$, where $\beta$ is the angle between $w_2$ and $a_2$.

As an incidental result of the SDMA strategy, the opposing weights and spatial signature estimates may be substantially orthogonal. That is $w_1$ may be substantially orthogonal to $a_2$, and $w_2$ may be substantially orthogonal to $a_1$. This may result in the in the angles between the respective weights and spatial signatures being substantially equal. That is, $\alpha$ may be substantially equal to $\beta$. In this case, the cosines will also be substantially equal. Since the cosines are the error factor, these calculations may result in substantially similar error factors.

Next these values are raised to the second power, i.e. squared, 218 resulting in quantities $|q_1|^2$ and $|q_2|^2$ respectively. The contribution ratio of the signal from the first remote terminal to the received signal can now be estimated 220 as being $|q_1|^2/(|q_1|^2+|q_2|^2)$ This division may result in the error factors described above substantially or completely canceling. The squaring operation may not affect the cancellation, since all error factors may get squared respectively. Mathematically this may be expressed as:

$$\frac{|q_1|^2}{|q_1|^2 + |q_2|^2} = \frac{(\|a_{1true}\|\cos(\alpha))^2}{(\|a_{1true}\|\cos(\alpha))^2} = \frac{\|a_{1true}\|^2 \cos^2(\alpha)}{\|a_{1true}\|^2\cos^2(\alpha) + \|a_{2true}\|^2\cos^2(\alpha)} = \frac{\|a_{1true}\|^2}{\|a_{1true}\|^2 + \|a_{2true}\|^2} \quad (12)$$

Referring to the contribution ratio as $C_r$, $C_r$ expresses the percentage of the power of the received signal attributable to the first remote terminal. To determine the actual power contributed, the total received power of the signal is estimated 222 and expressed in units of power, such as watts. Then, the estimated total power is multiplied 224 by the $C_r$, resulting in the estimation of the power contributed by the first remote terminal to the received signal. The above example determination of the power of the contribution attributable to the first remote terminal, $P_1$, can be summarized in the following equation:

$$P_1 = \frac{|<u_1, a_1>|^2}{|<u_1, a_1>|^2 + |<u_2, a_2>|^2} P_{tot}; \quad (13)$$

where $P_1$ is the estimated power attributable to the first remote terminal;

$P_{tot}$ is the estimated total power of the received signal;

$a_1$ and $a_2$ are the spatial signature estimates; and $u_1$ and $u_2$ are the normalized weight vectors.

In similar fashion, the power of the contribution attributable to the second remote terminal, $P_2$, can be estimated as:

$$P_2 = \frac{|<u_2, a_2>|^2}{|<u_1, a_1>|^2 + |<u_2, a_2>|^2} P_{tot}. \quad (14)$$

It is possible to practice this example embodiment of the invention without necessarily performing the exact math ematical operations set forth with reference to FIG. 2. For example, the quantity $|q_1|$ may be calculated as:

$$|q_1|=|<u_1,a_1>|=y'y/(y'R_{zz}^{-1}y)^{1/2}; \quad (15)$$

where
$y=L^{-1}R_{zs1}$; and $LL^H=R_{zz}$, $LL^H$ being the Cholesky factorization of $R_{zz}$, where $R_{zz}$ can be calculated as in Equation 8. As one skilled in the art understands, there are numerous alternative mathematical expressions of the power estimates. Embodiments of the present invention are not limited to any specific mathematical formulation.

Base Station Structure

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 3 shows an example of a base station of a wireless communications system or network suitable for implementing the present invention. The system or network includes a number of subscriber stations, also referred to as remote terminals or user terminals, such as that shown in FIG. 4. The base station may be connected to a wide area network (WAN) through its host DSP 31 for providing any required data services and connections external to the immediate wireless system. To support spatial diversity, a plurality of antennas 3 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the present example, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 17 (hereinafter "timeslot processor") for further processing, including calibration, according to one aspect of this invention. Eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station. Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33.

The RF timing controller 33 interfaces with the RF system, shown as block 45 and also produces a number of timing signals that are used by both the RF system and the modem. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 35. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 35. The transmit modules 35 up-convert the signals to the transmission frequency and amplify the signals. The amplified transmission signal outputs are sent to antennas 3 via the duplexer/time switch 7.

User Terminal Structure

Figure 4:
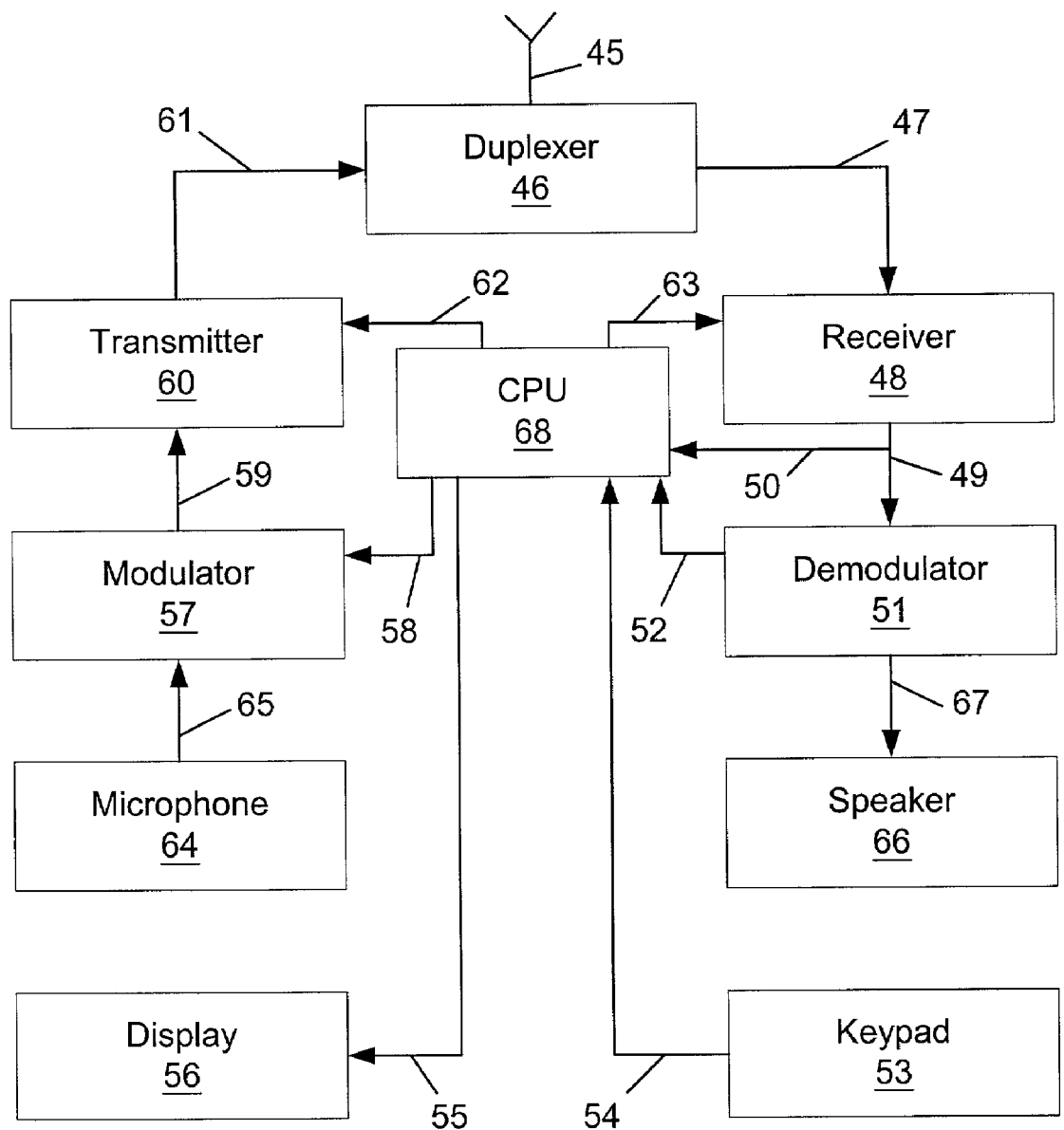
FIG. 4 is a simplified block diagram of a remote terminal on which an embodiment of the invention can be implemented.

FIG. 4 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer.

The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 3 and 4, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using an antenna array. However, the user terminals can also contain antenna arrays, and can also perform spatial processing both on receiving and transmitting (uplink and downlink) within the scope of the present invention.

Embodiments of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

The determination of several quantities related to embodiments of the present invention is described as using spatial signatures and weights. In these embodiments, similar quantities may be substituted that may have the same or similar characteristics. Even when these other quantities are used, they may be calculated in any suitable way. The present invention is not limited to using spatial signatures and weights. Nor is it limited to using any particular method for calculating spatial signatures and weights.

Various embodiments of the present invention have been described above as being used to estimate the power of signals received on spatial channels. That is, the embodiments have been shown as useful in estimating the power of terminals communicating with the same base station on the same conventional channel. However, embodiments of the present invention may also be used to estimate the power of signals received at the base station from terminals not communicating with the base station, but using the same conventional channel as at least one terminal that is communicating with the base station. These co-channel interferers may be communicating with different base stations, may be located in different cells, or may even be on a different wireless network.

Many of the methods and calculations are described in their most basic form, but steps can be added to or deleted from any of the methods and information can be added or subtracted from any of the described message signals without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   receiving a signal on a conventional communications channel at a plurality of antenna elements of a third radio, the received signal including a first component from a first radio and a second component from a second radio, the first and second radios communicating with the third radio using the conventional communications channel;
   determining a first radio weight used to receive signals from the first radio;
   estimating a first radio spatial signature;
   calculating a first power estimate for the first radio using the received signal, the first radio weight and the first radio spatial signature;
   calculating a second power estimate for the second radio using the received signal; and
   estimating a contribution of the first component to the received signal, the estimation using the first power estimate and the second power estimate.

2. The method of claim 1, wherein the first power estimate has a first error factor, the second power estimate has a second error factor, the second error factor being related to the first error factor.

3. The method of claim 2, wherein the first error factor is substantially the same as the second error factor.

4. The method of claim 3, wherein estimating a contribution of the first component to the received signal using the first power estimate and the second power estimate comprises combining the first power estimate with the second power estimate so that the first error factor and the second error factor substantially cancel.

5. The method of claim 3, wherein estimating a contribution of the first component to the received signal comprises dividing a first value related to the first power estimate by a second value related to the second power estimate.

6. The method of claim 1, wherein calculating the first power estimate comprises determining a metric of the first component, the metric being related to a quality of the first component.

7. The method of claim 6, wherein calculating the first power estimate comprises determining a SNR of the first component.

8. The method of claim 6, wherein calculating the first power estimate comprises determining a SINR of the first component.

9. The method of claim 1, wherein calculating the first power estimate comprises taking a product of the first radio weight and the first radio spatial signature.

10. The method of claim 9, wherein the first radio weight and the first radio spatial signature are represented as vectors, and wherein the product is a dot product.

11. The method of claim 1, wherein the first radio weight and the first radio spatial signature are represented as vectors, and wherein calculating the first power estimate comprises normalizing the first radio weight, and taking a dot product of the normalized first radio weight and the first radio spatial signature.

12. The method of claim 1, wherein at least a portion of the first component from the first radio comprises a known signal, and wherein calculating the first power estimate is carried out using the known signal.

13. The method of claim 1, wherein estimating the contribution of the first component to the received signal comprises calculating a ratio relating a power of the received signal to a power of the first component.

14. The method of claim 13, wherein estimating the contribution of the first component to the received signal comprises:
   estimating a total power of the received signal;
   calculating the power of the first component using the estimated total power of the received signal and the ratio relating the power of the received signal to the power of the first component.

15. The method of claim 14, wherein estimating the total power of the received signal comprises measuring the total power of the received signal.

16. The method of claim 1, wherein receiving the signal, calculating the first power estimate, calculating the second power estimate, and estimating the contribution are performed by the third radio.

17. The method of claim 16, wherein the first and second radios comprise remote terminals in a wireless communications network, and the third radio comprises a base station in the wireless communications network.

18. The method of claim 1, wherein the first power estimate comprises the square of the modulus of the dot product of a normalized weight vector for the first radio and the estimated first radio spatial signature, the second power estimate comprises the square of the modulus of the dot product of a normalized weight vector for the second radio and a spatial signature estimate for the second radio, and wherein estimating the contribution of the first component to the received signal comprises dividing the first power estimate by the sum of the first and second power estimates.

19. A machine-readable medium having stored thereon data representing instructions that, when executed by a processor, cause the processor to perform operations comprising:
receiving a signal on a conventional communications channel at a plurality of antenna elements of a third radio, the received signal including a first component from a first radio and a second component from a second radio, the first and second radios communicating with the third radio using the conventional communications channel;
determining a first radio weight used to receive signals from the first radio;
estimating a first radio spatial signature;
calculating a first power estimate for the first radio using the received signal, the first radio weight and the first radio spatial signature;
calculating a second power estimate for the second radio using the received signal; and
estimating a contribution of the first component to the received signal, the estimation using the first power estimate and the second power estimate.

20. The machine-readable medium of claim 19, wherein estimating a contribution of the first component to the received signal using the first power estimate and the second power estimate comprises combining the first power estimate with the second power estimate so that a first error factor of the first power estimate and a second error factor of the second power estimate substantially cancel.

21. The machine-readable medium of claim 20, wherein estimating a contribution of the first component to the received signal comprises dividing a first value related to the first power estimate by a second value related to the second power estimate.

22. The machine-readable medium of claim 19, wherein calculating the first power estimate comprises determining a SINR of the first component.

23. The machine-readable medium of claim 19, wherein the first radio weight and the first radio spatial signature are represented as vectors, and wherein calculating the first power estimate comprises normalizing the first radio weight, and taking a dot product of the normalized first radio weight and the first radio spatial signature.

24. The machine-readable medium of claim 19, wherein estimating the contribution of the first component to the received signal comprises:
estimating a total power of the received signal;
calculating the power of the first component using the estimated total power of the received signal and a ratio relating the power of the received signal to the power of the first component.

25. The machine-readable medium of claim 19, wherein the first power estimate comprises the square of the modulus of the dot product of a normalized weight vector for the first radio and the estimated first radio spatial signature, the second power estimate comprises the square of the modulus of the dot product of a normalized weight vector for the second radio and a spatial signature estimate for the second radio, and wherein estimating the contribution of the first component to the received signal comprises dividing the first power estimate by the sum of the first and second power estimates.

26. A communications device comprising:
a receiver for receiving a signal on a conventional communications channel at a plurality of antenna elements of the communications device, the received signal including a first component from a first radio and a second component from a second radio, the first and second radios communicating with the communications device using the conventional communications channel;
a processor communicatively coupled to the receiver for:
determining a first radio weight used to receive signals from the first
estimating a first radio spatial signature;
calculating a first power estimate for the first radio using the received signal, the first radio weight and the first radio spatial signature;
calculating a second power estimate for the second radio using the received signal; and
estimating a contribution of the first component to the received signal, the estimation using the first power estimate and the second power estimate.

27. The communications device of claim 26, wherein the first power estimate has a first error factor, the second power estimate has a second error factor, the second error factor being related to the first error factor.

28. The communications device of claim 27, wherein the first error factor is substantially the same as the second error factor.

29. The communications device of claim 28, wherein estimating a contribution of the first component to the received signal using the first power estimate and the second power estimate comprises combining the first power estimate with the second power estimate so that the first error factor and the second error factor substantially cancel.

30. The communications device of claim 28, wherein estimating a contribution of the first component to the received signal comprises dividing a first value related to the first power estimate by a second value related to the second power estimate.

31. The communications device of claim 26, wherein calculating the first power estimate comprises determining a metric of the first component, the metric being related to a quality of the first component.

32. The communications device of claim 31, wherein calculating the first power estimate comprises determining a SNR of the first component.

33. The communications device of claim 31, wherein calculating the first power estimate comprises determining a SINR of the first component.

34. The communications device of claim 26, wherein calculating the first power estimate comprises:
determining a first radio weight used to receive signals from the first radio;
estimating a first radio spatial signature;
calculating the first power estimate using the first radio weight and the first radio spatial signature.

35. The communications device of claim 34, wherein calculating the first power estimate comprises taking a product of the first radio weight and the first radio spatial signature.

36. The communications device of claim 35, wherein the first radio weight and the first radio spatial signature are represented as vectors, and wherein the product is a dot product.

37. The communications device of claim 34, wherein the first radio weight and the first radio spatial signature are represented as vectors, and wherein calculating the first power estimate comprises normalizing the first radio weight, and taking a dot product of the normalized first radio weight and the first radio spatial signature.

38. The communications device of claim 26, wherein at least a portion of the first component from the first radio comprises a known signal, and wherein calculating the first power estimate is carried out using the known signal.

39. The communications device of claim 26, wherein estimating the contribution of the first component to the received signal comprises calculating a ratio relating a power of the received signal to a power of the first component.

40. The communications device of claim 39, wherein estimating the contribution of the first component to the received signal comprises:
   estimating a total power of the received signal;
   calculating the power of the first component using the estimated total power of the received signal and the ratio relating the power of the received signal to the power of the first component.

41. The communications device of claim 40, wherein estimating the total power of the received signal comprises measuring the total power of the received signal.

42. The communications device of claim 26, wherein the first and second radios comprise remote terminals in a wireless communications network, and the communications device comprises a base station in the wireless communications network.

43. The communications device of claim 26, wherein the first power estimate comprises the square of the modulus of the dot product of a normalized weight vector for the first radio and the estimated first radio spatial signature, the second power estimate comprises the square of the modulus of the dot product of a normalized weight vector for the second radio and a spatial signature estimate for the second radio, and wherein estimating the contribution of the first component to the received signal comprises dividing the first power estimate by the sum of the first and second power estimates.

44. The communications device of claim 26, wherein the communications device comprises a remote terminal in the wireless communications network.

* * * * *